June 13, 1950  W. K. SINGH  2,511,131
ELECTRICAL EQUIPMENT
Filed Aug. 14, 1947

William Kartar Singh
INVENTOR
By [signature]
his ATTY.

Patented June 13, 1950

2,511,131

UNITED STATES PATENT OFFICE 2,511,131

ELECTRICAL EQUIPMENT

William Kartar Singh, South Ruislip, England

Application August 14, 1947, Serial No. 768,533
In Great Britain May 20, 1947

3 Claims. (Cl. 321—57)

This invention relates to electrical equipment, and has for its chief object to provide a method of, and apparatus for, producing substantially a two or more phase current from a single phase supply without the necessity of using mechanically moving parts.

The method of producing a substantially two or more phase current from a single phase supply according to the present invention in its broadest aspect comprises generating an alternating current flux in a closed iron circuit by means of a single phase supply, dividing the flux into two or more parts, varying the phase of the flux in one or more parts by means of one or more shorted turns and utilising the two or more fluxes to produce two or more alternating currents of different phase.

The apparatus for producing a substantially two or more phase current from a single phase supply according to the present invention comprises a laminated iron core defining at least two parallel closed magnetic flux paths having a common portion, an input winding carried by that part of the core defining the common portion of the flux paths, a shorted turn disposed about at least one of the other parts of the core defining one of the flux paths, and an output winding about said flux path.

The present invention is more particularly concerned with the production of a substantially two-phase current from a single phase supply, in which case the output winding about that limb of the core which carries the shorted turn will produce a current, the phase of which is displaced from the phase of the input current, and the other current to produce the two-phase current may be obtained from a further output winding carried by the other limb of the core or from the input winding itself.

In order that this invention may be the more clearly understood and readily carried into effect, reference may be made to the accompanying drawings, in which—

Figure 1:
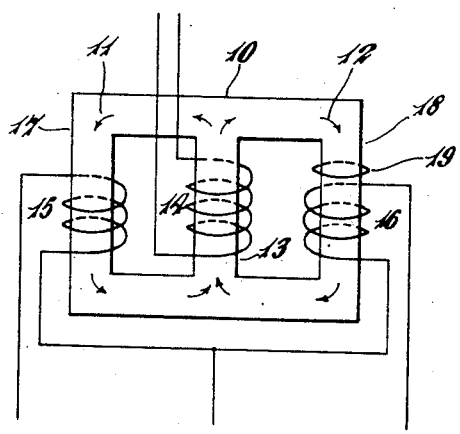
Figure 2:
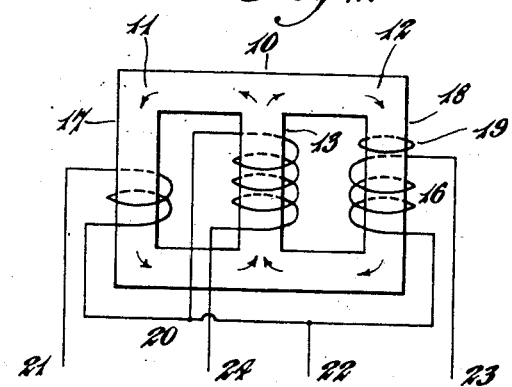

Figure 1 illustrates diagrammatically the preferred method of producing a substantially two-phase current from a single-phase supply, and Figure 2 illustrates a modification of the same.

Referring now to Figure 1 of the accompanying drawings, the apparatus therein illustrated comprises a laminated iron core 10 of the form normally used in transformer construction, said core defining two parallel magnetic flux paths 11 and 12 which have a common portion in the centre limb of the core. An input winding 14 carried by the centre limb 13 is supplied with single-phase current and the magnetic flux set up in the centre limb will, by reason of the construction of the core, be divided into two parts and will flow in the flux paths 11 and 12. Two output windings 15 and 16 are carried by the outer limbs 17, 18 of the core and, in the absence of any means affecting the magnetic fluxes flowing in the paths 11 and 12, the currents in the windings 15 and 16 would be in phase with one another. If, however, we arrange a shorted turn 19 about, say, the limb 18, the phase of the magnetic flux within the output winding 16 will be varied and hence the phase of the current flowing in the output winding 16 will differ from that flowing in the output winding 15.

By connecting up the windings 15 and 16, as shown, we shall then have a substantially two-phase current produced from a single phase supply without the use of mechanically moving parts.

The degree of displacement of the phase angle of the current in the secondary winding 16 will depend upon the construction and arrangement of the shorted turn 19, as will be well understood.

Given that by means of the shorted turn 19 it is possible to cause a phase displacement of the current in the winding 16, it will be appreciated that it is not necessary to use a separate output winding 15 to produce the two-phase current. It is possible to tap off the second phase from the primary or input winding 14, as at 20, whereupon, if we connect up the windings as shown in Figure 2 of the drawings, we shall have a substantially two-phase current, the phases being across the leads 21, 22 and 22 and 23.

By means of the present invention it is also, if desired, possible to produce a three or more phase current from a single-phase current without the use of mechanically moving parts. Thus, for example, a three-phase current may be produced by having a laminated closed iron core with four limbs defining three magnetic flux paths having one portion, i. e., the centre limb, common and by the use of two different shorted turns on two of the limbs or by producing a two-phase current from the current flowing in the winding 15 or the winding 16 in the manner described above.

I claim:

1. Apparatus for producing a two phase current from a single-phase current comprising a closed laminated iron core defining at least two parallel closed magnetic flux paths having a common portion, an input winding carried by that part of the core defining the common portion of the flux paths, a shorted turn disposed about one of the other parts of the core defining one of the flux paths and an output winding about each of the said flux paths.

2. Apparatus for producing a two-phase current from a single-phase current which comprises; a laminated closed-E-form iron core, an input winding carried by the centre limb of the core, an output winding carried by each of the outer limbs of the core, and a shorted turn about one limb of the core, whereby the phase of the current flowing in the output winding carried by that limb will be varied with respect to the phase of the current flowing in the other output winding, and the two output windings, when suitably combined, will produce a two-phase current.

3. Apparatus for producing a two-phase current from a single-phase current which comprises; a laminated closed-E-form iron core, an input winding carried by the centre limb of the core, an output winding carried by each of the outer limbs of the core and a shorted turn on one limb of the core, whereby the phase of the current flowing in said output winding is displaced from what it would otherwise be, said output winding, when suitably connected up with the input winding, or a portion of the same, serving to produce a two-phase current from the single-phase input.

WILLIAM KARTAR SINGH.

REFERENCES CITED

The following references are of record in the file of this patent:

UNITED STATES PATENTS

| Number | Name | Date |
|---|---|---|
| 732,204 | Lunt | June 30, 1903 |
| 1,157,730 | Spinelli | Oct. 26, 1915 |
| 1,566,333 | Lucas | Dec. 22, 1925 |
| 2,364,558 | Stocker | Dec. 4, 1944 |